Dec. 6, 1960

O. FIRING 2,962,921

ELEMENT ATTACHING MACHINE WITH CONTINUOUS WIRE FEED

Filed June 28, 1956

INVENTOR

Osborne Firing

BY H. F. Johnston

ATTORNEY 2,962,921
Patented Dec. 6, 1960

2,962,921

ELEMENT ATTACHING MACHINE WITH CONTINUOUS WIRE FEED

Osborne Firing, Woodbury, Conn., assignor to Scovill Manufacturing Company, Waterbury, Conn., a corporation of Connecticut Filed June 28, 1956, Ser. No. 594,601

1 Claim. (Cl. 83—355)

This invention relates to an apparatus for manufacturing slide fastener stringers and particularly to a machine for forming and shaping slide fastener elements and attaching them continuously on a tape.

The invention more specifically pertains to a machine which cuts the elements from a special Y-shaped wire to provide a blank with legs and a head, and which forms a recess and projection on the head and which clamps the legs on a tape to form a finished fastener stringer.

In the past, machines of this character have advanced the wire stock intermittently or stepwise for each element or blank that was severed therefrom, which because of the inertia of the wire placed a limitation on the speed of the machine and otherwise lessened its efficiency.

This invention is an improvement on the machine disclosed in my application, Serial No. 92,623, filed May 11, 1949, now Patent 2,763,051.

The primary object of this invention is to provide a machine in which the wire stock is advanced continuously without any interruption, and wherein the knife remains stationary during the blank cutting operation and then is moved out of the way of the continually advancing wire stock during the period that the knife lies in the path of said stock.

Other objects and advantages of my invention will hereinafter more fully appear.

In the accompanying drawing I have shown for the purpose of illustration one embodiment somewhat schematically which my invention may assume in practice and wherein.

Figure 1:
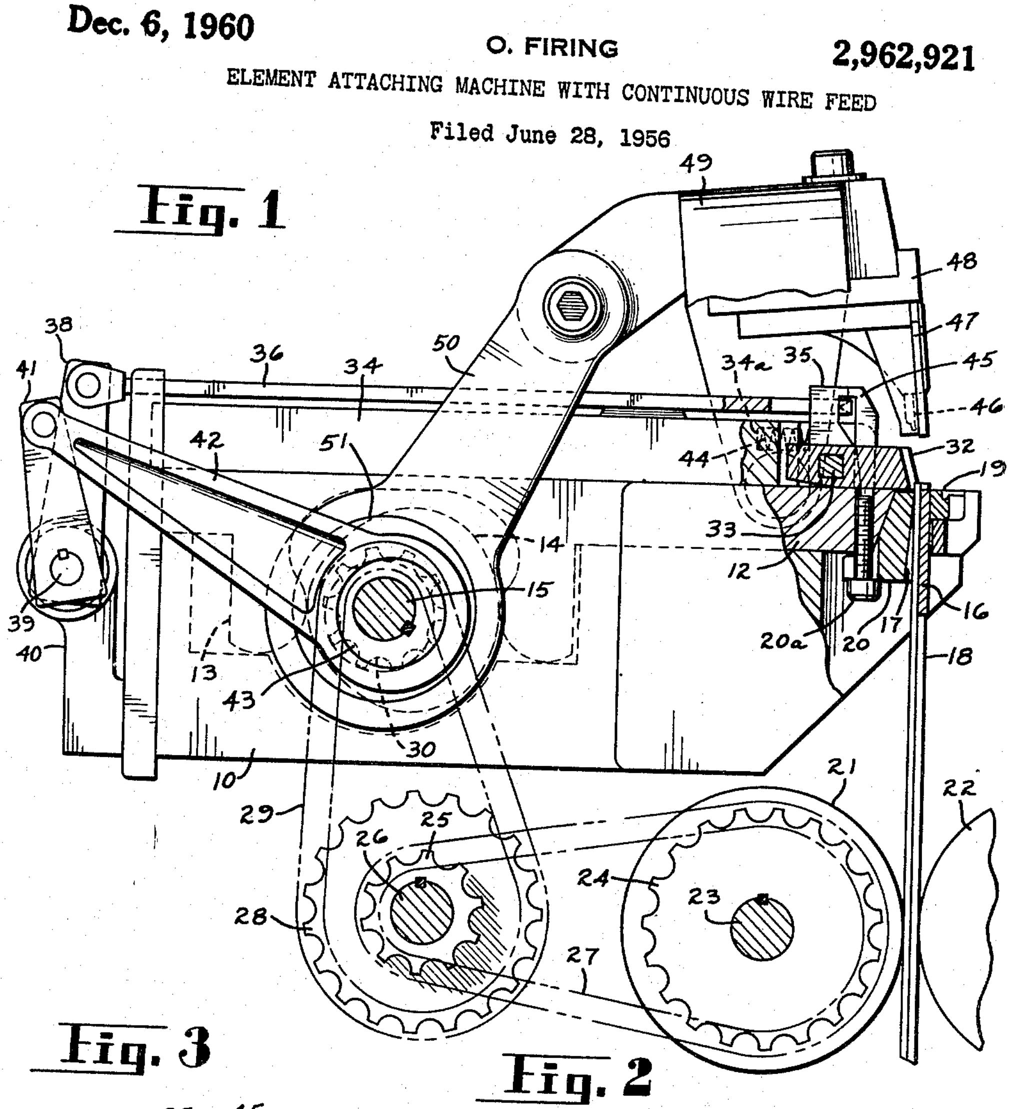
Fig. 1 is a side elevation of the essential portions of a zipper element attaching machine embodying my invention, showing the position of the knife in its blank-cutting position.

In the accompanying drawing I have shown only the essential mechanisms that are employed to operate the shearing knife, as the mechanism for operating the other movable elements of the machine are clearly disclosed in the above mentioned application.

In the machine here disclosed there is shown a slide housing 10 within which is slidably mounted a main slide 12. The slide 12 is formed with depending cam followers 13 that engage an eccentric cam 14 on main shaft 15. The main shaft 15 is journaled in suitable bearings in the slide housing 10 and driven by any suitable source of power.

The slide 12 carries a shearing or cut-off blade 16 mounted adjacent a clearance opening 17 in the slide and through which the wire stock 18 is fed. The slide 12 also carries a forming die 19 in which the blanks sheared from the wire stock are subsequently formed to provide the usual projection and socket in the head of the blank. The cut-off blade 16 and forming die 19 are removably held within the slide 12 by a wedge block 20 secured to said slide as by screws 20_a_.

The wire stock 18 is continuously fed upwardly through the opening 17 by a pair of feed rolls 21 and 22, the roll 21 being mounted on shaft 23 and power driven by a relatively large sprocket 24 from a smaller sprocket 25 on shaft 26 through a link chain 27. The shaft 26 in turn is operated by a relatively large sprocket 28 and link chain 29 driven by a smaller sprocket 30 on the main shaft 15. It is to be understood that the arrangement and relative size of the above sprocket-and-chain drive are such as to provide the proper continuous advancing speed of the wire commensurate with the cutting speed of the machine to obtain the desired width of the element sheared from the wire stock.

When the wire 18 has advanced its proper distance the slide 12 is moved to the left as viewed in Fig. 1 and underneath a shearing knife 32 mounted on shaft 33. The shaft 33 is journaled in a cover plate 34 that is removably secured to the housing 10 to hold the slide 12 in place. As the wire stock 18 moves under the knife 32 after the shearing operation it is necessary to move said knife out of the path of the advancing stock 18. For that purpose a pair of upwardly extending arms 35 are secured to shaft 33 on opposite sides of the knife 32 and are operated by a reciprocating connecting link 36. The forward end of the link 36 is formed with a T-shaped yoke 37 that straddles the knife 32 and has opposed projections 37_a_ engaging in suitable notches in the arms 35. The link 36 may be operated in properly timed relation from the main shaft 15. For that purpose the opposite end of the link 36 is connected to the upper end of a lever 38 keyed to a shaft 39 journaled in a bearing 40 attached to the rear face of the housing 10. Another lever 41 is also keyed to shaft 39 and the upper end in turn is connected to a pitman link 42 operated from an eccentric 43 on main shaft 15.

Figure 3:
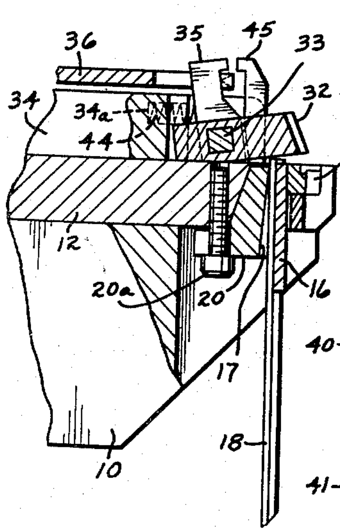
Fig. 3 is a vertical section through the forward end of the machine showing the knife elevated to clear the advancing wire stock.
Figure 2:
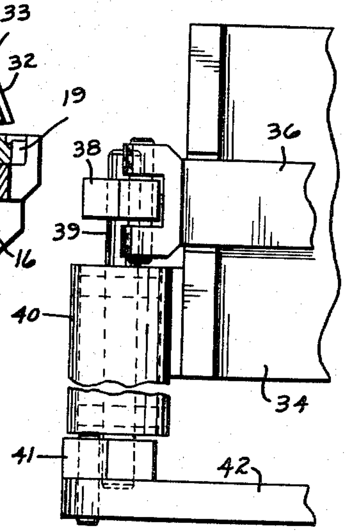
Fig. 2 is a plan view of a fragmentary portion of the machine showing only the principal working parts.
Figure 2:
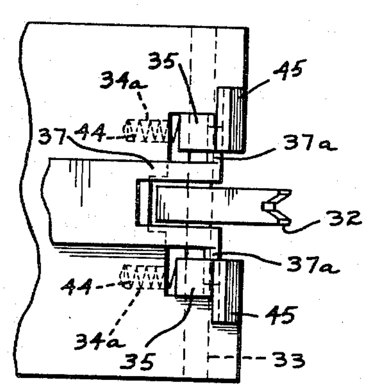

The reciprocating link 36 serves only to move the arms 35 to the left as viewed in Fig. 1 against coil springs 44 to elevate the forward end of the shearing knife 32 to the position as shown in Fig. 3. When the link 36 is returned to starting position, the arms 35 and knife 32 are returned to their normal position by springs 44 compressed between said arms 35 and retaining sockets 34_a_ in the adjacent end of the cover plate 34. The arms 35 are brought to a positive stop by a pair of stop blocks 45 mounted on the front end of the cover plate 34.

After a blank has been sheared off the end of the advancing stock 18 it will remain stationary until the die 19 moves under it. When in this position the die 19 will be in line with a forming punch 46 and a hold-down finger 47 that will engage the sheared element and hold it in the die during the punch-forming operation. The punch 46 and finger 47 are carried by a holder 48 secured to a pivoted yoke 49 that straddles the slide 12. The yoke 49 is operated by a connecting rod 50 driven by an eccentric 51 on main shaft 15.

One form of the invention is presented herein for the purpose of exemplification, but it will be obvious that the invention can be susceptible of other modified forms within the scope of the appended claim.

I claim:

In a machine for making slide fastener stringers, a horizontal slide having reciprocating motion only and having a vertical hole through which passes the end portion of a continuous wire, means for continuously feeding said wire at a uniform rate through said hole in said slide, a shearing knife mounted above said slide in the path of the end of said wire for shearing blanks from the wire when the latter is moved by said slide under the shearing knife, a cross shaft to which said knife is fixed, spring means normally holding said knife in shearing position against said slide, means for reciprocating said slider and means connected to said shaft and operated by said slider reciprocating means for intermittently moving the same to lift said shearing knife out of the path of the advancing end of a wire after the cutting operation and during that period when said shearing knife is over the path of said advancing wire.

References Cited in the file of this patent

UNITED STATES PATENTS

| | | |
|---|---|---|
| 670,373 | Keiser | Mar. 19, 1901 |
| 758,315 | Hess | Apr. 26, 1904 |
| 1,064,009 | Robertson et al. | June 10, 1913 |
| 1,726,883 | Brooks | Sept. 3, 1929 |
| 1,744,818 | Warsen | Jan. 28, 1930 |
| 2,351,868 | Morgan | June 20, 1944 |
| 2,586,462 | Forster | Feb. 19, 1952 |